UNITED STATES PATENT OFFICE.

GEORGE G. MOREHEAD, OF SAN JOSE, CALIFORNIA.

ANT-EXTERMINATOR.

1,225,471. Specification of Letters Patent. Patented May 8, 1917.

No Drawing. Application filed October 11, 1915. Serial No. 55,209.

*To all whom it may concern:*

Be it known that I, GEORGE G. MOREHEAD, a citizen of the United States, residing at San Jose, in the county of Santa Clara and State of California, have invented new and useful Improvements in Ant-Exterminators, of which the following is a specification.

This invention relates to insecticides and has for its object to produce a simple and inexpensive composition of improved efficiency that will attract insects, particularly ants, and completely and permanently destroy them.

In carrying out this object, I produce a compound comprising generally a bromid and a syrup, the latter ingredient acting to lure the insects, while the former serves to destroy them, and also the fungi, such as black scale, upon which they feed.

More particularly described, my improved composition consists of a bromid such as sodium or potassium bromid either separately or together, but preferably a mixture of the two.

To about one ounce of bromid of this nature is added one pound of syrup such as cane or glucose, or preferably a mixture of the two.

This compound when applied to trees, shrubbery and other places inhabited by insects will quickly attract them on account of the presence of the syrup, and the insects coming in contact therewith will be entirely destroyed by the bromids, drying them up and completely annihilating them.

I have also found that this preparation will destroy the fungi, particularly the black scale formed on trees, upon which the ants feed.

What I claim as my invention is:

An insect exterminator, comprising a bromid of an alkaline metal, one portion, in substance sixteen portions of a syrupy vehicle containing glucose.

In testimony whereof I have hereunto set my hand in the presence of two subscribing witnesses.

GEORGE G. MOREHEAD.

Witnesses:
A. G. DANIELSON,
B. A. FRUHLING.

Copies of this patent may be obtained for five cents each, by addressing the "Commissioner of Patents, Washington, D. C."